United States Patent
Tiefensee

(10) Patent No.: US 10,820,589 B2
(45) Date of Patent: Nov. 3, 2020

(54) EMULSIFIABLE CONCENTRATE

(71) Applicant: BASF SE, Ludwigshafen am Rhein (DE)

(72) Inventor: Kristin Tiefensee, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 16/480,432

(22) PCT Filed: Jan. 23, 2018

(86) PCT No.: PCT/EP2018/051519
§ 371 (c)(1),
(2) Date: Jul. 24, 2019

(87) PCT Pub. No.: WO2018/141575
PCT Pub. Date: Aug. 9, 2018

(65) Prior Publication Data
US 2019/0380331 A1 Dec. 19, 2019

(30) Foreign Application Priority Data

Feb. 1, 2017 (EP) .................................. 17154235

(51) Int. Cl.
*A01N 25/22* (2006.01)
*A01N 25/04* (2006.01)
*A01N 25/30* (2006.01)
*A01N 43/653* (2006.01)

(52) U.S. Cl.
CPC ............ *A01N 25/22* (2013.01); *A01N 25/04* (2013.01); *A01N 25/30* (2013.01); *A01N 43/653* (2013.01)

(58) Field of Classification Search
None
See application file for complete search history.

(56) References Cited

U.S. PATENT DOCUMENTS

| | | | |
|---|---|---|---|
| 2003/0069135 | A1 | 4/2003 | Kober et al. |
| 2018/0092352 | A1 | 4/2018 | Tiefenensee et al. |
| 2018/0368405 | A1 | 12/2018 | Tiefenensee et al. |

FOREIGN PATENT DOCUMENTS

| | | |
|---|---|---|
| WO | 2001067860 A1 | 9/2001 |
| WO | 2011109689 A1 | 9/2011 |
| WO | 2012069514 A1 | 5/2012 |
| WO | 2014154448 A1 | 10/2014 |

OTHER PUBLICATIONS

International Search Report for International Application No. PCT/EP2018/051519, dated Mar. 7, 2018, 4 pages.
Written Opinion of the International Searching Authority for International Application No. PCT/EP2018/051519, dated Mar. 7, 2018, 5 pages.
Hexamoll DINCH (Technical Information Sheet), Apr. 2016, retrieved Jul. 18, 2019 from: http://www.plasticizers.basf.com/portal/streamer?fid=277338, 3 pages.
European Search Report for EP Patent Application No. 17154235.0, dated May 23, 2017, 3 pages.

*Primary Examiner* — Brian J Davis
(74) *Attorney, Agent, or Firm* — Armstrong Teasdale LLP

(57) ABSTRACT

An emulsifiable concentrate includes a pesticide, 1,2-cyclohexandicarboxylic acid diisononyl ester, an amide of the formula (I) as defined herein and a nonionic surfactant. The invention further relates to a process for the preparation of the concentrate; an emulsion obtainable by mixing water, a pesticide, 1,2-cyclohexandicarboxylic acid diisononyl ester, a nonionic surfactant and an amide of the formula (I). The invention further relates to a method for controlling phytopathogenic fungi and/or undesirable plant growth and/or undesirable insect or mite infestation and/or for regulating the growth of plants. The method includes allowing the concentrate or the emulsion to act on the respective pests, protecting the habitat thereof or the plants to be protected from the respective pest, on the soil and/or on undesirable plants and/or the crop plants and/or the habitat thereof. The present invention includes combinations of preferred features with other preferred features.

11 Claims, No Drawings

EMULSIFIABLE CONCENTRATE

CROSS-REFERENCE TO RELATED APPLICATIONS

This application is a U.S. National Phase Application of PCT/EP2018/051519, filed Jan. 23, 2018, which claims the benefit of priority to EP Application No. 17154235.0, filed Feb. 1, 2017, the contents of which are hereby expressly incorporated by reference in their entirety.

The present invention relates to an emulsifiable concentrate consisting of a pesticide, 1,2-cyclo-hexandicarboxylic acid diisononyl ester, an amide of the formula (I) as defined herein and a nonionic surfactant. The invention further relates to a process for the preparation of said concentrate; an emulsion obtainable by mixing water, a pesticide, 1,2-cyclohexandicarboxylic acid diisononyl ester, a nonionic surfactant and an amide of the formula (I); and to a method for controlling phytopathogenic fungi and/or undesirable plant growth and/or undesirable insect or mite infestation and/or for regulating the growth of plants, wherein the emulsifiable concentrate or the emulsion is allowed to act on the respective pests, the habit thereof or the plants to be protected from the respective pest, on the soil and/or on undesirable plants and/or the crop plants and/or the habitat thereof. The present invention comprises combinations of preferred features with other preferred features.

Emulsifiable concentrates (also referred to as EC) are widely used formulations in crop protection. EC are typically based on hydrophobic solvents with high dissolution power. Due to their hydrophobicity they typically result in stable emulsions when diluted with water. WO 2011/109689 describes an emulsifiable concentrate comprising a solvent component comprising 1,2-cyclohexandicarboxylic acid diisononyl ester, an active component, and an emulsifier component comprising an anionic surfactant, a nonionic surfactant and an a surfactant different from said anionic surfactant and said nonionic surfactant and comprising at least one ethylene oxide block. WO 2001/067860 describes an agrotechnical formulation containing in relation to the total weight of the formulation: a) between 20 and 99.9 wt.-% of at least one cyclohexane polycarboxlic acid ester; b) between 0 and 70 wt.-% of water; c) between 0.1 and 60 wt.-% of at least one auxiliary agent and/or additive; and d) between 0 and 70 wt.-% of at least one active ingredient for treating plants.

However, there is still a need in the agrochemical industry to provide further stable emulsifiable concentrates.

Therefore, it was an object of the present invention to provide emulsifiable concentrates that result in stable emulsions which are stable for more than 24 hours.

The object was achieved by an emulsifiable concentrate consisting of
 a) a pesticide,
 b) 1,2-cyclohexandicarboxylic acid diisononyl ester,
 c) an amide of the formula (I)

$R^1$—C(O)N(R$^2$)$_2$     (I)

where $R^1$ is $C_5$-$C_{19}$-alkyl and $R^2$ is $C_1$-$C_4$-alkyl, and
 d) a nonionic surfactant.

Usually, an emulsifiable concentrate is taken to mean compositions which form an oil-in-water emulsion upon mixing with water (e.g. in a weight ratio of 1 part concentrate to 99 parts water).

Alkyl in the context of the present invention shall mean branched or linear alkyl chains as well as saturated or unsaturated alkyl chains.

In one embodiment of the invention (c) amides of the formula (I) are those in which $R^1$ is $C_6$-$C_{12}$-alkyl, or $R^1$ is linear $C_6$-$C_{12}$-alkyl, and $R^2$ is methyl. In another embodiment amides of the formula (I) are those in which $R^1$ is $C_6$-$C_{12}$-alkyl and $R^2$ is methyl. In another embodiment of the invention amides of the formula (I) are those where $R^1$ is octyl and/or decyl and/or dodecyl and $R^2$ is methyl. In another embodiment of the invention, the amide of formula (I) is N,N-Dimethyldecan-1-amide. In another embodiment of the invention, the emulsion according to the invention comprises from 45 to 55% by weight of amide of the formula (I), based on the total weight of the emulsifiable concentrate.

Mixtures of amides of the formula (I) are also possible, for example mixtures where $R^1$ is $C_6$-$C_{12}$-alkyl and $R^2$ is methyl, or where $R^1$ is $C_8$-$C_{10}$-alkyl or $C_{10}$-alkyl or 012-alkyl and $R^2$ is methyl. Mixtures of amides of the formula (I) comprise in most cases two amides of the formula (I) in an amount of in each case at least 30% by weight (in a further embodiment at least 40% by weight) based on the total amount of amides of the formula (I).

The term pesticide (a) refers to at least one active substance selected from the group of the fungicides, insecticides, nematicides, herbicides, safeners, molluscicides, rodenticides and/or growth regulators. In another embodiment of the invention pesticides are fungicides, insecticides, herbicides and growth regulators. In another embodiment of the invention pesticides are herbicides, fungicides and insecticides. Mixtures of pesticides from two or more of the above-mentioned classes may also be used. The skilled person is familiar with such pesticides, which can be found, for example, in Pesticide Manual, 14th Ed. (2006), The British Crop Protection Council, London. Suitable pesticides that can be combined with components (b), (c) and (d) of the present invention are:

A) strobilurins:
 azoxystrobin, dimoxystrobin, coumoxystrobin, coumethoxystrobin, enestroburin, fluoxastrobin, kresoxim-methyl, metominostrobin, orysastrobin, picoxystrobin, pyraclostrobin, pyrametostrobin, pyraoxystrobin, pyribencarb, trifloxystrobin, methyl 2-[2-(2,5-dimethylphenyloxymethyl)phenyl]-3-methoxyacrylate, 2-(2-(3-(2,6-dichlorophenyl)-1-methylallylideneaminooxymethyl)phenyl)-2-methoxyimino-N-methylacetamide;
 B) carboxamides:
 carboxanilides: benalaxyl, benalaxyl-M, benodanil, bixafen, boscalid, carboxin, fenfuram, fenhexamid, flutolanil, furametpyr, isopyrazam, isotianil, kiralaxyl, mepronil, metalaxyl, metalaxyl-M (mefenoxam), ofurace, oxadixyl, oxycarboxin, penflufen (N-(2-(1,3-dimethyl-butyl)phenyl)-1,3-dimethyl-5-fluoro-1H-pyrazole-4-carboxamide), penthiopyrad, sedaxane, tecloftalam, thifluzamide, tiadinil, 2-amino-4-methylthiazole-5-carboxanilide, N-(3',4', 5'-trifluorobiphenyl-2-yl)-3-difluoromethyl-1-methyl-1H-pyrazole-4-carboxamide, N-(4'-trifluorome-thylthiobiphenyl-2-yl)-3-difluoromethyl-1-methyl-1H-pyrazole-4-carboxamide, N-(2-(1,3,3-trimethylbutyl)phenyl)1,3-dimethyl-5-fluoro-1H-pyrazole-4-carboxamide;
 carboxylic acid morpholides: dimethomorph, flumorph, pyrimorph;
 benzamides: flumetover, fluopicolide, fluopyram, zoxamid;
 other carboxamides: carpropamid, diclocymet, mandipropamid, oxytetracyclin, silthiofam, N-(6-methoxypyridin-3-yl)cyclopropanecarboxamide;

C) azoles:
triazoles: azaconazole, bitertanol, bromuconazole, cyproconazole, difenoconazole, diniconazole, diniconazole-M, epoxiconazole, fenbuconazole, fluquinconazole, flusilazole, flutriafol, hexaconazole, imibenconazole, ipconazole, metconazole, myclobutanil, oxpoconazole, paclobutrazole, penconazole, propiconazole, prothioconazole, simeconazole, tebuconazole, tetraconazole, triadimefon, triadimenol, triticonazole, uniconazole;
imidazoles: cyazofamid, imazalil, imazalil sulfate, pefurazoate, prochloraz, triflumizole;
benzimidazoles: benomyl, carbendazim, fuberidazole, thiabendazole;
others: ethaboxam, etridiazole, hymexazole, 2-(4-chlorophenyl)-N-[4-(3,4-dimethoxyphenyl)isoxazol-5-yl]-2-prop-2-ynyloxyacetamide;

D) nitrogenous heterocyclyl compounds
pyridines: fluazinam, pyrifenox, 3-[5-(4-chlorophenyl)-2,3-dimethylisoxazolidin-3-yl]pyridine, 3-[5-(4-methylphenyl)-2,3-dimethylisoxazolidin-3-yl]pyridine;
pyrimidines: bupirimate, cyprodinil, diflumetorim, fenarimol, ferimzone, mepanipyrim, nitrapyrin, nuarimol, pyrimethanil;
piperazines: triforine;
pyrroles: fludioxonil, fenpiclonil;
morpholines: aldimorph, dodemorph, dodemorph acetate, fenpropimorph, tridemorph;
piperidines: fenpropidin;
dicarboximides: fluorimid, iprodione, procymidone, vinclozolin;
nonaromatic 5-membered heterocyclic rings: famoxadon, fenamidon, flutianil, octhilinone, probenazole, S-allyl 5-amino-2-isopropyl-3-oxo-4-orthotolyl-2,3-dihydropyrazole-1-thiocarboxylate;
others: acibenzolar-S-methyl, amisulbrom, anilazin, blasticidin-S, captafol, captan, quinomethionate, dazomet, debacarb, diclomezine, difenzoquat, difenzoquat methylsulfate, fenoxanil, folpet, oxolinic acid, piperalin, proquinazid, pyroquilon, quinoxyfen, triazoxide, tricyclazole, 2-butoxy-6-iodo-3-propylchromen-4-one, 5-chloro-1-(4,6-dimethoxypyrimidin-2-yl)-2-methyl-1H-benzimidazole, 5-chloro-7-(4-methylpiperidin-1-yl)-6-(2,4,6-trifluorophenyl)-[1,2,4]triazolo[1,5-a]pyrimidine, 5-ethyl-6-octyl-[1,2,4]triazolo[1,5-a]pyrimidin-7-ylamine;

E) carbamates and dithiocarbamates
thio- and dithiocarbamates: ferbam, mancozeb, maneb, metam, methasulphocarb, metiram, propineb, thiram, zineb, ziram;
carbamates: diethofencarb, benthiavalicarb, iprovalicarb, propamocarb, propamocarb hydrochloride, valiphenal, (4-fluorophenyl) N-(1-(1-(4-cyanophenyl)ethanesulfonyl)-but-2-yl)carbamate;

F) other fungicides
guanidines: dodine, dodine free base, guazatine, guazatine acetate, iminoctadine, iminoctadine triacetate, iminoctadine tris(albesilate);
antibiotics: kasugamycin, kasugamycin hydrochloride hydrate, polyoxins, streptomycin, validamycin A;
nitrophenyl derivatives: binapacryl, dicloran, dinobuton, dinocap, nitrothal-isopropyl, tecnazene;
organometallic compounds: fentin salts such as, for example, fentin acetate, fentin chloride, fentin hydroxide;
sulfurous heterocyclyl compounds: dithianon, isoprothiolane;
organophosphorus compounds: edifenphos, fosetyl, fosetyl-aluminum, iprobenfos, phosphorous acid and its salts, pyrazophos, tolclofos-methyl;
organochlorine compounds: chlorthalonil, dichlofluanid, dichlorphen, flusulfamide, hexachlorobenzene, robenzene, pencycuron, pentachlorophenol and its salts, phthalide, quintozene, thiophanate-methyl, tolylfluanid, N-(4-chloro-2-nitrophenyl)-N-ethyl-4-methylbenzenesulfonamide;
inorganic active substances: phosphorous acid and its salts, Bordeaux mixture, copper salts such as, for example, copper acetate, copper hydroxide, copper oxychloride, basic copper sulfate, sulfur;
biological products for controlling fungi, plant strengthening products: *Bacillus subtilis* strain NRRL No. B-21661 (for example the products RHAPSODY®, SERENADE® MAX and SERENADE® ASO from AgraQuest, Inc., USA.), *Bacillus pumilus* strain NRRL No. B-30087 (for example SONATA® and BALLAD® Plus from AgraQuest, Inc., USA), *Ulocladium oudemansii* (for example BOTRY-ZEN from BotriZen Ltd., New Zealand), chitosan (for example AR-MOUR-ZEN from BotriZen Ltd., New Zealand).
others: biphenyl, bronopol, cyflufenamid, cymoxanil, diphenylamine, metrafenon, mildiomycin, oxine-copper, prohexadione-calcium, spiroxamin, tolylfluanid, N-(cyclopropylmethoxy-imino-(6-difluoromethoxy-2,3-difluorophenyl)methyl)-2-phenylacetamide, N'-(4-(4-chloro-3-trifluoromethylphenoxy)-2,5-dimethylphenyl)-N-ethyl-N-methylformamidine, N'-(4-(4-fluoro-3-trifluoromethylphenoxy)-2,5-dimethylphenyl)-N-ethyl-N-methylformamidine, N'-(2-methyl-5-trufluoromethyl-4-(3-trimethylsilanylpropoxy)phenyl)-N-ethyl-N-methylformamidine, N'-(5-difluoromethyl-2-methyl-4-(3-trimethylsilanylpropoxy)phenyl)-N-ethyl-N-methylformamidine, N-methyl-(1,2,3,4-tetrahydronaphthalen-1-yl)-2-{1-[2-(5-methyl-3-trifluoromethylpyrazol-1-yl)acetyl]piperidin-4-yl}thiazole-4-carboxylate, N-methyl-(R)-1,2,3,4-tetrahydronaphthalen-1-yl 2-{1-[2-(5-methyl-3-trifluoromethylpyrazol-1-yl)acetyl]piperidin-4-yl}thiazole-4-carboxylate, 6-tert-butyl-8-fluoro-2,3-dimethylquinolin-4-yl acetate, 6-tert-butyl-8-fluoro-2,3-dimethylquinolin-4-yl methoxyacetate, N-methyl-2-{1-[2-(5-methyl-3-trifluoromethyl-1H-pyrazol-1-yl)acetyl]piperidin-4-yl}-N-[(1R)-1,2,3,4-tetrahydronaphthalen-1-yl]-4-thiazolecarboxamide;

G) growth regulators abscisic acid, amidochlor, ancymidole, 6-benzylaminopurine, brassinolide, butralin, chlormequat (chlormequat chloride), choline chloride, cyclanilid, daminozide, dikegulac, dimethipin, 2,6-dimethylpuridine, ethephon, flumetralin, flurprimidol, fluthiacet, forchlorfenuron, gibberellic acid, inabenfid, indole-3-acetic acid, maleic hydrazide, mefluidid, mepiquat (mepiquat chloride), metconazole, naphthaleneacetic acid, N-6-benzyladenine, paclobutrazole, prohexadione (prohexadione-calcium), prohydrojasmone, thidiazuron, triapenthenol, tributylphosphorotrithioate, 2,3,5-triiodobenzoic acid, trinexapac-ethyl and uniconazole;

H) herbicides
acetamide: acetochlor, alachlor, butachlor, dimethachlor, dimethenamid, flufenacet, mefenacet, metolachlor, metazachlor, napropamid, naproanilid, pethoxamid, pretilachlor, propachlor, thenylchlor;
amino acid analogs: bilanafos, glyphosate, glufosinate, sulfosate;

aryloxyphenoxypropionates: clodinafop, cyhalofop-butyl, fenoxaprop, fluazifop, haloxyfop, metamifop, propaquizafop, quizalofop, quizalofop-P-tefuryl;

bipyridyls: diquat, paraquat;

carbamates and thiocarbamates: asulam, butylate, carbetamide, desmedipham, dimepiperat, eptam (EPTC), esprocarb, molinate, orbencarb, phenmedipham, prosulfocarb, pyributicarb, thiobencarb, triallate;

cyclohexanediones: butroxydim, clethodim, cycloxydim, profoxydim, sethoxydim, tepraloxydim, tralkoxydim;

dinitroanilines: benfluralin, ethalfluralin, oryzalin, pendimethalin, prodiamine, trifluralin;

diphenyl ethers: acifluorfen, aclonifen, bifenox, diclofop, ethoxyfen, fomesafen, lactofen, oxyfluorfen;

hydroxybenzonitriles: bromoxynil, dichlobenil, ioxynil;

imidazolinones: imazamethabenz, imazamox, imazapic, imazapyr, imazaquin, imazethapyr;

phenoxyacetic acids: clomeprop, 2,4-dichlorophenoxyacetic acid (2,4-D), 2,4-DB, dichlorprop, MCPA, MCPA-thioethyl, MCPB, mecoprop;

pyrazines: chloridazon, flufenpyr-ethyl, fluthiacet, norflurazon, pyridate;

pyridines: aminopyralid, clopyralid, diflufenican, dithiopyr, fluridone, fluroxypyr, picloram, picolinafen, thiazopyr;

sulfonylureas: amidosulfuron, azimsulfuron, bensulfuron, chlorimuron-ethyl, chlorsulfuron, cinosulfuron, cyclosulfamuron, ethoxysulfuron, flazasulfuron, flucetosulfuron, flupyrsulfuron, foramsulfuron, halosulfuron, imazosulfuron, iodosulfuron, mesosulfuron, metsulfuron-methyl, nicosulfuron, oxasulfuron, primisulfuron, prosulfuron, pyrazosulfuron, rimsulfuron, sulfometuron, sulfosulfuron, thifensulfuron, triasulfuron, tribenuron, trifloxysulfuron, triflusulfuron, tritosulfuron, 1-((2-chloro-6-propylimidazo[1,2-b]pyridazin-3-Asulfonyl)-3-(4,6-dimethoxypyrimidin-2-yl)urea;

triazines: ametryne, atrazine, cyanazine, dimethametryne, ethiozine, hexazinone, metamitron, metribuzine, prometryne, simazine, terbuthylazine, terbutryne, triaziflam;

ureas: chlortoluron, daimuron, diuron, fluometuron, isoproturon, linuron, methabenzthiazuron, tebuthiuron;

other acetolactate synthase inhibitors: bispyribac-sodium, cloransulam-methyl, diclosulam, florasulam, flucarbazone, flumetsulam, metosulam, orthosulfamuron, penoxsulam, propoxycarbazone, pyribambenz-propyl, pyribenzoxim, pyriftalide, pyriminobac-methyl, pyrimisulfan, pyrithiobac, pyroxasulfon, pyroxsulam;

others: amicarbazone, aminotriazole, anilofos, beflubutamid, benazolin, bencarbazone, benfluresate, benzofenap, bentazone, benzobicyclon, bromacil, bromobutide, butafenacil, butamifos, cafenstrole, carfentrazone, cinidon-ethlyl, chlorthal, cinmethylin, clomazone, cumyluron, cyprosulfamid, dicamba, difenzoquat, diflufenzopyr, Drechslera monoceras, endothal, ethofumesate, etobenzanid, fentrazamide, flumiclorac-pentyl, flumioxazin, flupoxam, fluorochloridon, flurtamon, indanofan, isoxaben, isoxaflutol, lenacil, propanil, propyzamide, quinclorac, quinmerac, mesotrione, methylarsenic acid, naptalam, oxadiargyl, oxadiazone, oxaziclomefon, pentoxazone, pinoxaden, pyraclonil, pyraflufen-ethyl, pyrasulfotol, pyrazoxyfen, pyrazolynate, quinoclamin, saflufenacil, sulcotrione, sulfentrazone, terbacil, tefuryltrione, tembotrione, thiencarbazone, topramezone, 4-hydroxy-3-[2-(2-methoxyethoxymethyl)-6-trifluorome-thylpyridin3-carbonyl]bicyclo[3.2.1]oct-3-en-2-one, ethyl (3-[2-chloro-4-fluoro-5-(3-methyl-2,6-dioxo-4-trifluoromethyl-3,6-dihydro-2H-pyrimidin-1-yl) phenoxy]pyridin-2-yloxy)acetate, methyl 6-amino-5-chloro-2-cyclopropylpyrimidine-4-carboxylate, 6-chloro-3-(2-cyclopropyl-6-methylphenoxy) pyridazin-4-ol, 4-amino-3-chloro-6-(4-chlorophenyl)-5-fluoropyridin-2-carboxylic acid, methyl 4-amino-3-chloro-6-(4-chloro-2-fluoro-3-methoxyphenyl)pyridin-2-carboxylate and methyl 4-amino-3-chloro-6-(4-chloro-3-dimethylamino-2-fluorophenyl)pyridin-2-carboxylate;

I) insecticides organo(thio)phosphates: acephate, azamethiphos, azinphos-methyl, chlorpyrifos, chlorpyrifos-methyl, chlorfenvinphos, diazinon, dichlorvos, dicrotophos, dimethoat, disulfoton, ethion, fenitrothion, fenthion, isoxathion, malathion, methamidophos, methidathion, methyl-parathion, mevinphos, monocrotophos, oxydemeton-methyl, paraoxon, parathion, phenthoate, phosalone, phosmet, phosphamidon, phorate, phoxim, pirimiphos-methyl, profenofos, prothiofos, sulprophos, tetrachlorvinphos, terbufos, triazophos, trichlorfon;

carbamates: alanycarb, aldicarb, bendiocarb, benfuracarb, carbaryl, carbofuran, carbosulfan, fenoxycarb, furathiocarb, methiocarb, methomyl, oxamyl, pirimicarb, propoxur, thiodicarb, triazamate;

pyrethroids: allethrin, bifenthrin, cyfluthrin, cyhalothrin, cyphenothrin, cypermethrin, alpha-cypermethrin, beta-cypermethrin, zeta-cypermethrin, deltamethrin, esfenvalerate, etofenprox, fenpropathrin, fenvalerate, imiprothrin, lambda-cyhalothrin, permethrin, prallethrin, pyrethrin I and II, resmethrin, silafluofen, tau-fluvalinate, tefluthrin, tetramethrin, tralomethrin, transfluthrin, profluthrin, dimefluthrin, insect growth inhibitors: a) chitin synthesis inhibitors: benzoylureas: chlorfluazuron, cyramazin, diflubenzuron, flucycloxuron, flufenoxuron, hexaflumuron, lufenuron, novaluron, teflubenzuron, triflumuron; buprofezin, diofenolan, hexythiazox, etoxazole, clofentazin; b) ecdysone antagonists: halofenozide, methoxyfenozide, tebufenozide, azadirachtin; c) juvenoids: pyriproxyfen, methoprene, fenoxycarb; d) lipid biosynthesis inhibitors: spirodiclofen, spiromesifen, spirotetramate;

nicotine receptor agonists/antagonists: clothianidin, dinotefuran, imidacloprid, thiamethoxam, nitenpyram, acetamiprid, thiacloprid, 1-(2-chlorothiazol-5-ylmethyl)-2-nitrimino-3,5-dimethyl-[1,3,5]triazinane;

GABA antagonists: endosulfan, ethiprole, fipronil, vaniliprole, pyrafluprole, pyriprole, N-5-amino-1-(2,6-dichloro-4-methylphenyl)-4-sulfinamoyl-1H-pyrazole-3-thiocarboxamide;

macrocyclic lactones: abamectin, emamectin, milbemectin, lepimectin, spinosad, spinetoram;

mitochondrial electron transport chain inhibitor (METI) I acaricides: fenazaquin, pyridaben, tebufenpyrad, tolfenpyrad, flufenerim;

METI II and III substances: acequinocyl, fluacyprim, hydramethylnone;

decouplers: chlorfenapyr;

inhibitors of oxidative phosphorylation: cyhexatin, diafenthiuron, fenbutatin oxide, propargite;

insect ecdysis inhibitors: cryomazin;

'mixed function oxidase' inhibitors: piperonyl butoxide;

sodium channel blockers: indoxacarb, metaflumizon;

others: benclothiaz, bifenazate, cartap, flonicamid, pyridalyl, pymetrozin, sulfur, thiocyclam, flubendiamid, chlorantraniliprole, cyazypyr (HGW86); cyenopyrafen, flupyrazofos, cyflumetofen, amidoflumet, imicyafos, bistrifluron and pyrifluquinazone.

The pesticide may comprise at least one water-insoluble pesticide. Water-insoluble pesticides may have a solubility in water of up to 10 g/l, or up to 1 g/l, or up to 0.5 g/l, at 20° C.

The pesticide may be soluble in the carboxylic acid amide according to formula (I), e.g. in an amount of at least 5 g/l, or at least 20 g/l or at least 40 g/l, at 20° C.

The pesticide may have a melting point of at least 40° C., or at least 60° C., or at least 80° C.

In another embodiment of the invention pesticide (a) is selected from a fungicide, a herbicide or a mixture thereof. A fungicide or a herbicide in this context shall mean at least one fungicide or at least one herbicide. In a further embodiment of the invention, the fungicide can be selected from triazole fungicides. In another embodiment of the invention, the herbicide can be selected from a diphenylether herbicide. This embodiment of the invention shall also include mixtures of triazole fungicides and diphenylether herbicides.

In a further embodiment of the invention, the emulsifiable concentrate consists of
a) a pesticide selected from fungicides and/or herbicides,
b) 1,2-cyclohexandicarboxylic acid diisononyl ester,
c) an amide of the formula (I)

where $R^1$ is $C_5$-$C_{19}$-alkyl and $R^2$ is $C_1$-$C_4$-alkyl, and
d) a nonionic surfactant.

In another embodiment of the invention, the emulsifiable concentrate consists of
a) a fungicide or triazole fungicide or herbicide or diphenyl ether, or mixtures thereof,
b) 1,2-cyclohexandicarboxylic acid diisononyl ester,
c) an amide of the formula (I)

where $R^1$ is $C_5$-$C_{19}$-alkyl and $R^2$ is $C_1$-$C_4$-alkyl, and
d) a nonionic surfactant.

In accordance with the present invention, the triazole fungicide can be selected from the group consisting of azaconazole, bitertanol, bromuconazole, cyproconazole, difenoconazole, diniconazole, diniconazole-M, epoxiconazole, fenbuconazole, fluquinconazole, flusilazol, flutriafol, hexaconazole, imibenconazole, ipconazole, metconazole, myclobutanil, oxpoconazole, paclobutrazol, penconazole, propiconazole, prothioconazole, simeconazole, tebuconazole, tetraconazole, triadimefon, triadimenol, triticonazole, uniconazole, 1-(4-chlorophenyl)-2-([1,2,4]triazol-1-yl)cycloheptanol. In a further embodiment of the invention, the triazole fungicide in the emulsifiable concentrate of the present invention is tebuconazole.

In accordance with the present invention, the diphenyl ether can be selected from the group consisting of acifluorfen, aclonifen, bifenox, diclofop, ethoxyfen, fomesafen, lactofen, oxyfluorfen. In an embodiment of the invention, the diphenyl ether in the emulsifiable concentrate of the present invention is oxyfluorfen.

The emulsifiable concentrate of the present invention consists of 15 to 35 by weight of pesticide, or fungicide or herbicide or a mixture of fungicide and herbicide based on the total weight of the emulsifiable concentrate. In another embodiment of the invention, it consists of from 20% to 30% by weight of pesticide, or fungicide or herbicide or a mixture of fungicide and herbicide based on the total weight of the emulsifiable concentrate.

The emulsifiable concentrate of the present invention can comprise one or more further pesticides. The term pesticides refers to at least one active substance selected from the group of fungicides, insecticides, nematicides, herbicides, safeners and/or growth regulators. In an embodiment of the present invention pesticides are fungicides other than triazole fungicides, insecticides, herbicides other than diphenyl ether herbicides and growth regulators. In another embodiment of the present invention, the further pesticide is water-insoluble. Usually, it is soluble in water to not more than 1 g/l, or not more than 200 mg/l and or not more than 50 mg/l at 25° C. Using simple preliminary experiments, the skilled worker can select a pesticide with a suitable water-solubility. In another embodiment of the present invention, the emulsifiable concentrate does not comprise any further pesticide.

The emulsifiable concentrate further contains a nonionic surfactant. Suitable nonionic surfactants are alkoxylates, N-substituted fatty acid amides, amine oxides, esters, sugar-based surfactants, polymeric surfactants, and mixtures thereof. Examples of alkoxylates are compounds such as alcohols, alkylphenols, amines, amides, arylphenols, fatty acids or fatty acid esters which have been alkoxylated with 1 to 50 equivalents. Ethylene oxide and/or propylene oxide may be employed for the alkoxylation. In another embodiment of the invention, ethylene oxide may be employed for the alkoxylation. Examples of N-substituted fatty acid amides are fatty acid glucamides or fatty acid alkanolamides. Examples of esters are fatty acid esters, glycerol esters or monoglycerides. Examples of sugar-based surfactants are sorbitans, ethoxylated sorbitans, sucrose and glucose esters or alkylpolyglucosides. Examples of polymeric surfactants are homo- or copolymers of vinylpyrrolidone, vinylalcohols, or vinylacetate. In a further embodiment of the present invention, nonionic surfactants are alkoxylates. Nonionic surfactants such as alkoxylates may also be employed as adjuvants.

In another embodiment of the invention, the emulsifiable concentrate contains at least one alkoxylate as nonionic surfactant, or fatty acids or fatty acid esters which have been alkoxylated with 1 to 50 ethylene oxide and/or propylene oxide units. Ethylene oxide and/or propylene oxide may be employed for the alkoxylation. In another embodiment of the invention, ethylene oxide is employed for the alkoxylation. In another embodiment of the invention, the emulsifiable concentrate comprises at least one alkoxylated (ethoxylated) triglycerides. In a further embodiment of the invention the alkoxylated fatty acid ester is ethoxylated casteroil with 30 to 45 ethylene oxide units. The emulsifiable concentrate may contain of from 8 to 15% by weight of alkoxylates, whereby in another embodiment of the invention, the alkoxylate is an alkoxylated fatty acid esters as defined above or ethoxylated casteroil with 30 to 45 ethylene oxide units.

In another embodiment of the invention, the emulsifiable concentrate comprises at least one nonionic surfactant. In a further embodiment of the invention, the emulsifiable concentrate consists of from 8% to 15% by weight of nonionic surfactants, in each case based on the total weight of the emulsifiable concentrate. In another embodiment of the invention the emulsifiable concentrate consists of from 9% to 12% by weight of nonionic surfactants, in each case based on the total weight of the emulsifiable concentrate.

To the emulsion as defined below or the emulsifiable concentrate further components can be added such as auxiliaries conventionally used for crop protection products. Suitable auxiliaries are solvents, liquid carriers, dispersants, wetters, adjuvants, solubilizers, penetrants, protective colloids, stickers, thickeners, bactericides, antifreeze agents, antifoam agents, colorants, adhesives and binders.

Suitable solvents and liquid carriers are organic solvents such as mineral oil fractions with medium to high boiling point, for example kerosene, diesel oil; oils of vegetable or animal origin; aliphatic or cyclic hydrocarbons; alcohols, for example ethanol, propanol, butanol, cyclohexanol; glycols; ketones, for example cyclohexanone; esters, for example carbonates, fatty acid esters, gamma-butyrolactone; fatty acids; phosphonates; amines; amides, for example N-methylpyrrolidone; and their mixtures.

Suitable adjuvants are compounds which have negligible or even no pesticidal activity themselves, and which improve the biological performance of the compound I on the target. Examples are surfactants, mineral or vegetable oils, and other auxilaries. Further examples are listed by Knowles, Adjuvants and Additives, Agrow Reports DS256, T&F Informa UK, 2006, chapter 5.

Suitable bactericides are bronopol and isothiazolinone derivatives such as alkylisothiazolinones and benzisothiazolinones. Suitable antifreeze agents are ethylene glycol, propylene glycol, urea and glycerol. Suitable antifoam agents are silicones, long-chain alcohols, and salts of fatty acids. Suitable colorants (e.g. in red, blue, or green) are pigments which are sparingly soluble in water, and water-soluble dyes. Examples are inorganic colorants (e.g. iron oxide, titanium oxide, iron hexacyanoferrate) and organic colorants (e.g. alizarin, azo and phthalocyanine colorants).

In another embodiment, the invention relates to an emulsifiable concentrate comprising 15 to 35% by weight of a triazole fungicide or tebuconazole, 8 to 15% by weight of 1,2-cyclohexandicarboxylic acid diisononyl ester, 45 to 55% by weight of an amide of the formula (I)

$$R^1\text{—}C(O)N(R^2)_2 \quad (I)$$

where $R^1$ is $C_5$-$C_{19}$-alkyl and $R^2$ is $C_1$-$C_4$-alkyl; or where $R^1$ is $C_8$-$C_{10}$-alkyl, $C_{10}$-alkyl or $C_{12}$-alkyl and $R^2$ is $C_1$-alkyl and 8 to 15% by weight of a nonionic surfactant, based on the total weight of the emulsifiable concentrate.

In another embodiment, the invention relates to an emulsifiable concentrate consisting of consists of
 a) a pesticide selected from fungicides or triazole fungicides and/or herbicides or diphenylether herbicides, or mixtures thereof
 b) 1,2-cyclohexandicarboxylic acid diisononyl ester,
 c) an amide of the formula (I)

$$R^1\text{—}C(O)N(R^2)_2 \quad (I)$$

where $R^1$ is $C_5$-$C_{19}$-alkyl and $R^2$ is $C_1$-$C_4$-alkyl, or where $R^1$ is $C_8$-$C_{10}$-alkyl, $C_{10}$-alkyl or $C_{12}$-alkyl and $R^2$ is $C_1$-alkyl, and
 d) a nonionic surfactant, or ethoxylated casteroil with 30 to 45 ethylene oxide units.

In another embodiment of the invention, the emulsifiable concentrate consists of
 a) 15 to 35% by weight of a pesticide selected from fungicides or triazole fungicides and/or herbicides or diphenylether herbicides, or mixtures thereof
 b) 8 to 15% by weight of 1,2-cyclohexandicarboxylic acid diisononyl ester,
 c) 45 to 55% by weight of an amide of the formula (I)

$$R^1\text{—}C(O)N(R^2)_2 \quad (I)$$

where $R^1$ is $C_5$-$C_{19}$-alkyl and $R^2$ is $C_1$-$C_4$-alkyl, or where $R^1$ is $C_8$-$C_{10}$-alkyl, $C_{10}$-alkyl or $C_{12}$-alkyl and $R^2$ is $C_1$-alkyl, and d) 8 to 15% by weight of a nonionic surfactant, or ethoxylated casteroil with 30 to 45 ethylene oxide units.

The invention furthermore relates to a process for the preparation of the emulsifiable concentrate according to the invention by mixing a pesticide as defined above, 1,2-cyclohexandicarboxylic acid diisononyl ester, the amide of the formula (I) as defined above and the nonionic surfactant as defined above.

The invention furthermore relates to an emulsion obtainable (preferably obtained) by mixing the emulsifiable concentrate of the invention with water. The emulsion normally arises spontaneously upon mixing. In most cases, the emulsion is an oil-in-water emulsion. In one embodiment of the invention, the emulsion contains 0.1 to 10% of emulsifiable concentrate in water. In another embodiment of the invention, the emulsion contains 0.5 to 5% of emulsifiable concentrate in water.

The invention furthermore relates to a controlling phytopathogenic fungi and/or undesirable plant growth and/or undesirable insect or mite infestation and/or for regulating the growth of plants, wherein the emulsion according to the present invention as defined above or the emulsifiable concentrate of the present invention is allowed to act on the respective pests, the habit thereof or the plants to be protected from the respective pest, on the soil and/or on undesirable plants and/or the crop plants and/or the habitat thereof.

The therapeutic treatment of humans and animals is excluded from the method for controlling phytopathogenic fungi.

Examples of suitable crop plants are cereals, for example wheat, rye, barley, triticale, oats or rice; beet, for example sugar or fodder beet; pome fruit, stone fruit and soft fruit, for example apples, pears, plums, peaches, almonds, cherries, strawberries, raspberries, currants or gooseberries; legumes, for example beans, lentils, peas, lucerne or soybeans; oil crops, for example oilseed rape, mustard, olives, sunflowers, coconut, cacao, castor beans, oil palm, peanuts or soybeans; cucurbits, for example pumpkins/squash, cucumbers or melons; fiber crops, for example cotton, flax, hemp or jute; citrus fruit, for example oranges, lemons, grapefruit or tangerines; vegetable plants, for example spinach, lettuce, asparagus, cabbages, carrots, onions, tomatoes, potatoes, pumpkin/squash or capsicums; plants of the laurel family, for example avocados, cinnamon or camphor; energy crops and industrial feedstock crops, for example maize, soybeans, wheat, oilseed rape, sugar cane or oil palm; tobacco; nuts; coffee; tea; bananas; wine (dessert grapes and grapes for vinification); hops; grass, for example turf; sweetleaf (*Stevia rebaudania*); rubber plants and forest plants, for example flowers, shrubs, deciduous trees and coniferous trees, and propagation material, for example seeds, and harvested products of these plants.

The term crop plants also includes those plants which have been modified by breeding, mutagenesis or recombinant methods, including the biotechnological agricultural products which are on the market or in the process of being developed. Genetically modified plants are plants whose genetic material has been modified in a manner which does not occur under natural conditions by hybridizing, mutations or natural recombination (i.e. recombination of the genetic material). Here, one or more genes will, as a rule, be integrated into the genetic material of the plant in order to improve the plant's properties. Such recombinant modifications also comprise posttranslational modifications of proteins, oligo- or polypeptides, for example by means of glycosylation or binding of polymers such as, for example, prenylated, acetylated or farnesylated residues or PEG residues.

Examples which may be mentioned are plants which, as the result of plant-breeding and recombinant measures, have acquired a tolerance for certain classes of herbicides, such as hydroxyphenylpyruvate dioxygenase (HPPD) inhibitors, acetolactate synthase (ALS) inhibitors such as, for example, sulfonylureas (EP-A 257 993, U.S. Pat. No. 5,013,659) or imidazolinones (for example U.S. Pat. No. 6,222,100, WO 01/82685, WO 00/26390, WO 97/41218, WO 98/02526, WO 98/02527, WO 04/106529, WO 05/20673, WO 03/14357, WO 03/13225, WO 03/14356, WO 04/16073), enolpyruvylshikimate 3-phosphate synthase (EPSPS) inhibitors such as, for example, glyphosate (see, for example, WO 92/00377), glutamine synthetase (GS) inhibitors such as, for example, glufosinate (see, for example, EP-A 242 236, EP-A 242 246) or oxynil herbicides (see, for example, U.S. Pat. No. 5,559,024). For example, breeding and mutagenesis have given rise to Clearfield® oilseed rape (BASF SE, Germany), which features tolerance for imidazolinones, for example imazamox. With the aid of recombinant methods, crop plants such as soybeans, cotton, maize, beet and oilseed rape have been generated which are resistant to glyphosate or glufosinate, and these are available by the brand names RoundupReady® (glyphosate-resistant, Monsanto, U.S.A.) and Liberty Link® (glufosinate-resistant, Bayer CropScience, Germany).

Also comprised are plants which, with the aid of recombinant measures, produce one or more toxins, for example those from the bacterial strain *Bacillus*. Toxins which are produced by such genetically modified plants comprise, for example, insecticidal proteins of *Bacillus* spp., in particular from *B. thuringiensis*, such as the endotoxins Cry1Ab, Cry1Ac, Cry1F, Cry1Fa2, Cry2Ab, Cry3A, Cry3Bb1, Cry9c, Cry34Ab1 or Cry35Ab1; or vegetable insecticidal proteins (VIPs), for example VIP1, VIP2, VIP3, or VIP3A; insecticidal proteins from nematode-colonizing bacteria, for example Photorhabdus spp. or Xenorhabdus spp.; toxins from animal organisms, for example wasp, spider or scorpion toxins; fungal toxins, for example from Streptomycetes; plant lectins, for example from pea or barley; agglutinins; proteinase inhibitors, for example trypsin inhibitors, serine protease inhibitors, patatin, cystatin or papain inhibitors; ribosome-inactivating proteins (RIPs), for example ricin, maize RIP, abrin, luffin, saporin or bryodin; steroid-metabolizing enzymes, for example 3-hydroxysteroid oxidase, ecdysteroid IDP glycosyl transferase, cholesterol oxidase, ecdysone inhibitors or HMG CoA-reductase; ion channel blockers, for example inhibitors of sodium or calcium channels; juvenile hormone esterase; receptors for the diuretic hormone (helicokinin receptors); stilbene synthase, bibenzyl synthase, chitinases and glucanases. These toxins can also be produced, in the plants, in the form of pretoxins, hybrid proteins, truncated or otherwise modified proteins. Hybrid proteins are distinguished by a novel combination of different protein domains (see, for example, WO 2002/015701). Further examples of such toxins or genetically modified plants which produce these toxins are disclosed in EP-A 374 753, WO 93/07278, WO 95/34656, EP-A 427 529, EP-A 451 878, WO 03/18810 and WO 03/52073. The methods for generating these genetically modified plants are known to the skilled person and explained, for example, in the abovementioned publications. A large number of the abovementioned toxins impart to the plants which produce them a tolerance for pests from all taxonomic classes of the arthropods, in particular beetles (Coeleropta), dipterans (Diptera) and lepidopterans (Lepidoptera) and nematodes (Nematoda). Genetically modified plants having one or more genes which code for insecticidal toxins are described for example in the abovementioned publications and are in some cases commercially available such as, for example, YieldGard® (maize varieties which produce the toxin Cry1Ab), YieldGard® Plus (maize varieties which produce the toxins Cry1Ab and Cry3Bb1), Starlink® (maize varieties which produce the toxin Cry9c), Herculex® RW (maize varieties which produce the toxins Cry34Ab1, Cry35Ab1 and the enzyme phosphinothricin N-acetyltransferase [PAT]); NuCOTN® 33B (cotton varieties which produce the toxin Cry1Ac), Bollgard® I (cotton varieties which produce the toxin Cry1Ac), Bollgard® II (cotton varieties which produce the toxins Cry1Ac and Cry2Ab2); VIPCOT® (cotton varieties which produce a VIP toxin); NewLeaf® (potato varieties which produce the toxin Cry3A); Bt-Xtra®, NatureGard®, KnockOut®, BiteGard®, Protecta®, Bt11 (for example Agrisure® CB) and Bt176 from Syngenta Seeds SAS, France, (maize varieties which produce the toxin Cry1Ab and the PAT enzyme), MIR604 from Syngenta Seeds SAS, France (maize varieties which produce a modified version of the toxin Cry3A, see in this context WO 03/018810), MON 863 from Monsanto Europe S.A., Belgium (maize varieties which produce the toxin Cry3Bb1), IPC 531 from Monsanto Europe S.A., Belgium (cotton varieties which produce a modified version of the toxin Cry1Ac) and 1507 from Pioneer Overseas Corporation, Belgium (maize varieties which produce the toxin Cry1F and the PAT enzyme).

Also comprised are plants which, with the aid of recombinant measures, produce one or more proteins which bring about an increased resistance to, or ability to withstand, bacterial, viral or fungal pathogens such as, for example, so-called pathogenesis-related proteins (PR proteins, see EP-A 0 392 225), resistance proteins (for example potato varieties which produce two resistance genes against *Phytophthora infestans* from the Mexican wild potato *Solanum bulbocastanum*) or T4 lysozyme (for example potato varieties which, as the result of the production of this protein, are resistant to bacteria such as *Erwinia amylvora*).

Also comprised are plants whose productivity has been improved with the aid of recombinant methods, for example by increasing the yield potential (for example biomass, grain yield, starch content, oil content or protein content), the tolerance for drought, salt or other limiting environmental factors, or the resistance to pests and fungal, bacterial and viral pathogens. Also comprised are plants whose constituents, in particular for improving human or animal nutrition, have been modified with the aid of recombinant methods, for example by oil plants producing health-promoting long-chain omega-3-fatty acids or monounsaturated omega-9-fatty acids (for example Nexera® oilseed rape, DOW Agro Sciences, Canada).

When employed in crop protection, the application rates of the pesticides amount to from 0.001 to 2 kg per ha, from 0.005 to 2 kg per ha, from 0.05 to 0.9 kg per ha or from 0.1 to 0.75 kg per ha, depending on the nature of the desired effect. In treatment of plant propagation materials such as seeds, e. g. by dusting, coating or drenching seed, amounts of active substance of from 0.1 to 1000 g, or from 1 to 1000 g, or from 1 to 100 g or from 5 to 100 g, per 100 kg of plant propagation material (preferably seed) are generally required. When used in the protection of materials or stored products, the amount of active substance applied depends on the kind of application area and on the desired effect. Amounts customarily applied in the protection of materials are 0.001 g to 2 kg, or 0.005 g to 1 kg, of active substance per cubic meter of treated material.

Various types of oils, wetters, adjuvants, fertilizers or micronutrients and further pesticides (for example herbicides, insecticides, fungicides, growth regulators, safeners) may be added to the emulsion in the form of a premix or optionally only shortly before use (tank mix). These agents can be admixed to the compositions according to the invention at a weight ratio of from 1:100 to 100:1, or from 1:10 to 10:1.

The user applies the emulsifiable concentrate or emulsion according to the invention usually from a predosage device, a knapsack sprayer, a spray tank, a spray plane, or an irrigation system. Usually, the agrochemical composition is made up with water, buffer, and/or further auxiliaries to the desired application concentration and the ready-to-use spray liquor or the agrochemical composition according to the invention is thus obtained. Usually, 20 to 2000 liters, or 50 to 400 liters, of the ready-to-use spray liquor are applied per hectare of agricultural useful area.

Advantages of the present invention are, inter alia, that an emulsion forms spontaneously upon dilution of the emulsifiable concentrate with water; that the emulsifiable concentrate does not require the presence of water; that the emulsifiable concentrate forms a stable emulsion upon dilution with water.

The examples which follow illustrate the invention without imposing any limitation.

EXAMPLES

Amide 1: N,N-Dimethyldecan-1-amide

NS1: nonionic surfactant, castor oil, ethoxylated, POE 35

Stabiliser: 1,2-cyclohexandicarboxylic acid diisononyl ester

Examples 1: Preparation of Emulsifiable Concentrates (EC) and Stability Test

The emulsifiable concentrates were prepared by mixing the components as described in Table 1. The stability has been assessed at room temperature according to CIPAC method MT 36. Example according to the invention is EC 1. CEC 1 represents a composition without stabiliser.

TABLE 1

Composition (all data in wt %)

|  | CEC 1 | EC 1 |
|---|---|---|
| Tebuconazole | 28.5 | 28.5 |
| Amide 1 | 61.5 | 51.5 |
| Stabiliser | — | 10.0 |
| NS1 | 10.0 | 10.0 |

Each EC of Table 1 was diluted in CIPAC water D (5% w/w EC in CIPAC water D).

The resulting emulsions were assessed according to their emulsion stability over time. The results are shown in Table 2.

TABLE 2

Emulsion stability test (5% EC in CIPAC water D)

|  | CEC 1 | EC 1 |
|---|---|---|
| After 1 h | stable | stable |
| After 4 h | stable | stable |
| After 24 h | Very unstable | stable |

Cipac D: water hardness 432 ppm (Ca:Mg=4:1)
Stable: no oil
Unstable: means maximum 0.5 ml oil
Very unstable: >0.5 ml oil

I claim:
1. An emulsifiable concentrate consisting of
a) a pesticide,
b) 1,2-cyclohexandicarboxylic acid diisononyl ester,
c) an amide of the formula (I)

$$R^1\text{—}C(O)N(R^2)_2 \qquad (I)$$

where $R^1$ is $C_5$-$C_{19}$-alkyl and $R^2$ is $C_1$-$C_4$-alkyl, and
d) a nonionic surfactant.
2. The concentrate according to claim 1, consisting of
a) 15 to 35% by weight of a pesticide,
b) 8 to 15% by weight of 1,2-cyclohexandicarboxylic acid diisononyl ester,
c) 45 to 55% by weight of an amide of the formula (I)

$$R^1\text{—}C(O)N(R^2)_2 \qquad (I)$$

where $R^1$ is $C_5$-$C_{19}$-alkyl and $R^2$ is $C_1$-$C_4$-alkyl, and
d) 8 to 15% by weight of a nonionic surfactant.
3. The concentrate according to claim 1, wherein the nonionic surfactant is an alkoxylate.
4. The concentrate according to claim 1, wherein the nonionic surfactant is a castor oil alkoxylate.
5. The concentrate according to claim 1, wherein $R^1$ is $C_6$-$C_{12}$-alkyl and $R^2$ is methyl.
6. The concentrate according to claim 1, wherein the pesticide is a fungicide or a herbicide or a mixture thereof.
7. The concentrate according to claim 6, wherein the fungicide is a triazole fungicide or the herbicide is a diphenylether.
8. A process for the preparation of the concentrate according to claim 1 by mixing the pesticide, the 1,2-cyclohexandicarboxylic acid diisononyl ester, the amide of the formula (I) and a nonionic surfactant.
9. An emulsion obtainable by mixing water, a pesticide, 1,2-cyclohexandicarboxylic acid diisononyl ester, an amide of the formula (I) as defined in claim 1 and a nonionic surfactant as defined in claim 1.
10. A method for controlling phytopathogenic fungi and/or undesirable plant growth and/or undesirable insect or mite infestation and/or for regulating the growth of plants, wherein the concentrate according to claim 1 is allowed to act on the respective pests, the habitat thereof or the plants to be protected from the respective pest, on the soil and/or on undesirable plants and/or the crop plants and/or the habitat thereof.
11. A method for controlling phytopathogenic fungi and/or undesirable plant growth and/or undesirable insect or mite infestation and/or for regulating the growth of plants, wherein the emulsion according to claim 9 is allowed to act on the respective pests, the habitat thereof or the plants to be protected from the respective pest, on the soil and/or on undesirable plants and/or the crop plants and/or the habitat thereof.

* * * * *